US012287300B2

United States Patent
Toraya (10) Patent No.: US 12,287,300 B2
(45) Date of Patent: Apr. 29, 2025

(54) DEVICE AND METHOD FOR ANALYZING DIFFRACTION PATTERN OF MIXTURE, AND INFORMATION STORAGE MEDIUM

(71) Applicant: Rigaku Corporation, Tokyo (JP)

(72) Inventor: Hideo Toraya, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 312 days.

(21) Appl. No.: 18/174,673

(22) Filed: Feb. 27, 2023

(65) Prior Publication Data
US 2023/0280290 A1 Sep. 7, 2023

(30) Foreign Application Priority Data
Mar. 2, 2022 (JP) .................................. 2022-031672

(51) Int. Cl.
*G01N 23/2055* (2018.01)

(52) U.S. Cl.
CPC .. *G01N 23/2055* (2013.01); *G01N 2223/0566* (2013.01); *G01N 2223/1016* (2013.01); *G01N 2223/304* (2013.01); *G01N 2223/605* (2013.01)

(58) Field of Classification Search
None
See application file for complete search history.

(56) References Cited

U.S. PATENT DOCUMENTS

| | | | | |
|---|---|---|---|---|
| 7,372,941 B2 * | 5/2008 | Ivanisevic | ......... | G01N 23/2055 378/70 |
| 8,520,802 B2 * | 8/2013 | Kern | ...................... | G01N 23/20 378/75 |
| 8,875,078 B2 * | 10/2014 | Pisarenco | ............... | G03F 7/705 716/113 |
| 10,161,888 B2 * | 12/2018 | Ikeda | .................... | G01N 23/207 |
| 10,962,489 B2 * | 3/2021 | Toraya | ............... | G01N 23/2076 |
| 11,402,341 B2 * | 8/2022 | Toraya | ................. | G01N 23/207 |
| 11,841,334 B2 * | 12/2023 | Toraya | ............... | G01N 23/2055 |
| 11,852,597 B2 * | 12/2023 | Toraya | ................... | G01N 23/20 |
| 12,031,927 B2 * | 7/2024 | Toraya | ............... | G01N 23/2055 |
| 12,174,131 B2 * | 12/2024 | Kuzumaki | ........... | G01N 23/207 |
| 2004/0103130 A1 * | 5/2004 | Ivanisevic | .......... | G01N 23/2055 708/200 |

(Continued)

FOREIGN PATENT DOCUMENTS

| | | |
|---|---|---|
| JP | 2019-184254 A | 10/2019 |
| WO | 2017/149913 A1 | 9/2017 |
| WO | 2019/031019 A1 | 2/2019 |

*Primary Examiner* — Thomas R Artman
(74) *Attorney, Agent, or Firm* — XSENSUS LLP (57) ABSTRACT

A device for analyzing a diffraction pattern of a mixture uses a fitting pattern including a term related to a known target pattern, which indicates a target component and which is changeable in shape with use of a shape parameter, and a term related to an unknown pattern, which indicates a residual group. The fitting pattern is fitted to an observed pattern with a given value assigned to the shape parameter and with the unknown pattern set to an initial pattern. The unknown pattern is then changed, to thereby fit the fitting pattern to the observed pattern. The fitting described above is executed with use of a plurality of shape parameters each of which is the shape parameter, and a calculation result related to one of the plurality of shape parameters is selected.

10 Claims, 7 Drawing Sheets

(56) References Cited

U.S. PATENT DOCUMENTS

| | | | |
|---|---|---|---|
| 2012/0002787 A1* | 1/2012 | Kern | G01N 23/20 |
| | | | 250/390.09 |
| 2013/0035911 A1* | 2/2013 | Pisarenco | G03F 7/70633 |
| | | | 703/2 |
| 2014/0278147 A1* | 9/2014 | Sasaki | G01N 23/207 |
| | | | 702/28 |
| 2017/0343492 A1* | 11/2017 | Ikeda | G01N 23/207 |
| 2018/0364183 A1 | 12/2018 | Toraya et al. | |
| 2020/0173938 A1 | 6/2020 | Toraya et al. | |
| 2021/0018452 A1 | 1/2021 | Toraya et al. | |
| 2022/0187225 A1* | 6/2022 | Toraya | G01N 23/2055 |
| 2022/0390392 A1* | 12/2022 | Toraya | G01N 23/2055 |
| 2022/0390394 A1* | 12/2022 | Kuzumaki | G01N 23/207 |
| 2023/0280290 A1* | 9/2023 | Toraya | G01N 23/2055 |
| | | | 378/71 |

* cited by examiner

DEVICE AND METHOD FOR ANALYZING DIFFRACTION PATTERN OF MIXTURE, AND INFORMATION STORAGE MEDIUM

CROSS-REFERENCE TO RELATED APPLICATION

This application claims priority to Japanese Patent Application No. 2022-031672 filed on Mar. 2, 2022, the entire contents of which are incorporated by reference herein.

BACKGROUND OF THE INVENTION

1. Field of the Invention

The present invention relates to a device and a method for analyzing a diffraction pattern of a mixture, and an information storage medium, and to a technology of calculating intensity ratios of one or a plurality of known diffraction patterns included in an observed pattern of X-ray diffraction.

2. Description of the Related Art

Quantitative phase analysis of a mixture can be performed through use of an X-ray diffraction method. An actually observed diffraction pattern of the mixture includes known diffraction patterns derived from respective components in a superimposed manner. When the quantitative phase analysis is performed, intensity ratios of the known diffraction patterns derived from the respective components in the actually observed diffraction pattern are calculated. Once the intensity ratios are figured out, weight fractions of the respective components are calculable by, for example, one of the methods as described in JP WO 2017/149913 A1, JP WO 2019/031019 A1, and Japanese Patent Application Laid-open No. 2019-184254.

With the method of the related art described above, in decomposing the observed diffraction pattern into the plurality of known diffraction patterns, it is required to prepare the known diffraction patterns for all possible components. However, it is often difficult to prepare the known diffraction patterns for all components in reality. In addition, when accurate intensity ratios of the known diffraction patterns are known, a diffraction pattern of an unknown component can consequently be figured out. This enables structural analysis and the like of that component as well.

SUMMARY OF THE INVENTION

The present invention has been made in view of the above-mentioned problem, and therefore has an object to provide a device and a method for analyzing a diffraction pattern of a mixture, and a computer-readable information storage medium, with which, even in a case in which diffraction patterns are known for only some components, intensity ratios of the diffraction patterns of all components including remaining unknown components can be calculated accurately.

In order to achieve the above-mentioned object, there is provided a device for analyzing a diffraction pattern of a mixture, the device including: an observed pattern acquisition module configured to acquire an observed pattern of X-ray diffraction; a first fitting module configured to fit a fitting pattern to the observed pattern by assigning a given value to a shape parameter and changing a first intensity ratio and a second intensity ratio with an unknown pattern set to an initial pattern, the fitting pattern including a term that is multiplication of a known target pattern which indicates a target component and which is changeable in shape with use of the shape parameter by the first intensity ratio, and a term that is multiplication of the unknown pattern by the second intensity ratio, the unknown pattern indicating a residual group including one or more residual components, the first intensity ratio, the second intensity ratio, and the unknown pattern serving as fitting parameters of the fitting pattern; a second fitting module configured to fit, after the fitting by the first fitting module, the fitting pattern to the observed pattern by changing the unknown pattern with changes to the first intensity ratio and the second intensity ratio restricted; a parameter generation module configured to generate a plurality of shape parameters, each of which is the shape parameter; a control module configured to cause the first fitting module and the second fitting module to operate, by using each of the plurality of shape parameters; and a selection module configured to select the first intensity ratio related to one of the plurality of shape parameters, based on the unknown pattern.

In this case, the plurality of shape parameters may include lattice constants of the target component. Further, the plurality of shape parameters may include information about a width of a peak included in the known target pattern.

Further, the selection module may be configured to apply a function for conversion into a positive value to values indicating the unknown pattern, calculate a sum of values of the function, and select, based on the sum, the first intensity ratio related to one of the plurality of shape parameters.

Further, the selection module may be configured to apply a function for conversion into a positive value to amounts of change of values indicating the unknown pattern, calculate a sum of values of the function, and select, based on the sum, the first intensity ratio related to one of the plurality of shape parameters.

Further, each of the plurality of shape parameters may be used so that the first fitting module and the second fitting module are each caused to operate a plurality of times.

Further, the fitting pattern may further include a term of a temporary pattern serving as a fitting parameter. The first fitting module may be configured to fit the fitting pattern to the observed pattern by changing the temporary pattern as well as the first intensity ratio and the second intensity ratio. The second fitting module may be configured to change the unknown pattern so that at least a part of the term of the temporary pattern is absorbed by the term related to the residual group.

Further, the device may be configured to perform quantitative phase analysis of the target component based on the first intensity ratio and the second intensity ratio.

Further, according to at least one embodiment of the present invention, there is provided a method of analyzing a diffraction pattern of a mixture, the method including: an observed pattern acquisition step of acquiring an observed pattern of X-ray diffraction; a first fitting step of fitting a fitting pattern to the observed pattern by assigning a given value to a shape parameter and changing a first intensity ratio and a second intensity ratio with an unknown pattern set to an initial pattern, the fitting pattern including a term that is multiplication of a known target pattern which indicates a target component and which is changeable in shape with use of the shape parameter by the first intensity ratio, and a term that is multiplication of the unknown pattern by the second intensity ratio, the unknown pattern indicating a residual group including one or more residual components, the first intensity ratio, the second intensity ratio, and the unknown pattern serving as fitting parameters of the fitting pattern; a second fitting step of fitting, after the fitting in the first fitting step, the fitting pattern to the observed pattern by changing the unknown pattern with changes to the first intensity ratio and the second intensity ratio restricted; a parameter generation step of generating a plurality of shape parameters each of which is the shape parameter; a step of causing the first fitting step and the second fitting step to be executed, by using each of the plurality of shape parameters; and a step of selecting the first intensity ratio related to one of the plurality of shape parameters, based on the unknown pattern.

Further, according to at least one embodiment of the present invention, there is provided a computer-readable information storage medium having stored thereon a program for causing a computer to function as: an observed pattern acquisition module configured to acquire an observed pattern of X-ray diffraction; a first fitting module configured to fit a fitting pattern to the observed pattern by assigning a given value to a shape parameter and changing a first intensity ratio and a second intensity ratio with an unknown pattern set to an initial pattern, the fitting pattern including a term that is multiplication of a known target pattern which indicates a target component and which is changeable in shape with use of the shape parameter by the first intensity ratio, and a term that is multiplication of the unknown pattern by the second intensity ratio, the unknown pattern indicating a residual group including one or more residual components, the first intensity ratio, the second intensity ratio, and the unknown pattern serving as fitting parameters of the fitting pattern; a second fitting module configured to fit, after the fitting by the first fitting module, the fitting pattern to the observed pattern by changing the unknown pattern with changes to the first intensity ratio and the second intensity ratio restricted; a parameter generation module configured to generate a plurality of shape parameters each of which is the shape parameter; a control module configured to cause the first fitting module and the second fitting module to operate, by using each of the plurality of shape parameters; and a selection module configured to select the first intensity ratio related to one of the plurality of shape parameters, based on the unknown pattern.

DETAILED DESCRIPTION OF THE INVENTION

Now, at least one embodiment of the present invention will be described in detail with reference to the drawings.

(System Configuration)

Figure 1:
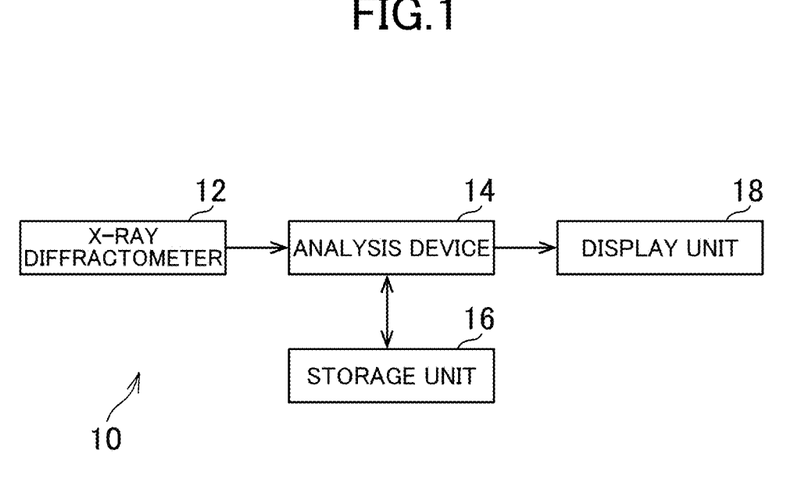
FIG. 1 is a diagram illustrating a configuration of an analysis system in at least one embodiment of the present invention.

FIG. 1 is a diagram illustrating a configuration of an analysis system in at least one embodiment of the present invention. As illustrated in FIG. 1, an analysis system 10 in the at least one embodiment includes an X-ray diffractometer 12, an analysis device 14, a storage unit 16, and a display unit 18.

The X-ray diffractometer 12 performs powder X-ray diffraction measurement. Specifically, the X-ray diffractometer 12 allows an X-ray having a known wavelength to enter a sample material, and measures an intensity of a diffraction X-ray. Data of an X-ray intensity for each value of a diffraction angle 2θ is output as an observed pattern from the X-ray diffractometer 12 to the analysis device 14.

In this example, the sample material to be analyzed by the system is a mixture, and the mixture contains one or more target components (target substances) and a residual group. The target components are components to be subjects of quantitative measurement. The residual group consists of one or more residual components (substances other than the target components). An example of the residual group is a group in which, although it is known at what mixture ratios components of what chemical compositions exist, diffraction patterns of the components are unknown. Another example is a group in which, although a chemical composition of the entire mixture is known by fluorescent analysis, for example, chemical compositions or mixture ratios are unknown for the residual group.

The analysis device 14 is formed of a known computer system, for example, and includes an arithmetic device and a memory. The storage unit 16 formed of a computer-readable information storage medium, for example, a solid state disk (SSD) or a hard disk drive (HDD), is connected to the analysis device 14. The storage unit 16 has stored therein an analysis program in at least one embodiment of the present invention, and this analysis program is executed by the analysis device 14 to implement an analysis method in at least one embodiment of the present invention.

In the storage unit 16, X-ray diffraction patterns of the respective target components alone are further stored in advance as target patterns. Those target patterns are generated by executing a predetermined algorithm with a computer system. The target patterns are calculated from various types of physical property data about the target components, but shapes thereof are adjustable by changing shape parameters. Here, lattice constants, which determines a position of each diffraction lines, and a full-width at half maximum, which determines a width of each diffraction lines, are used as shape parameters.

In the storage unit 16, an initial pattern of an unknown pattern, which is an X-ray diffraction pattern of the residual group, is further stored. In the at least one embodiment, this initial pattern is changed to bring the unknown pattern closer to a true pattern while. The initial pattern may be an X-ray diffraction pattern of a main component of components contained in the residual group. Alternatively, the initial pattern may be a linear combination of respective X-ray diffraction patterns of a plurality of components contained in the residual group. However, the initial pattern is not limited thereto. As described later, the initial pattern is changed to an appropriate pattern in the course of calculation, and hence an X-ray diffraction pattern of a substance that is not actually contained in the residual group may be used as the initial pattern.

In the storage unit 16, chemical composition information (types and atomic weights of contained atoms) and physical property data of the target components are further stored. In the storage unit 16, chemical composition information of the entire mixture, which is the sample, may be stored.

The display unit 18 is a display device for displaying results of analysis by the analysis device 14. For example, the display unit 18 displays intensity ratios of the target patterns and the unknown pattern, weight fractions of the respective target components, and a weight fraction of the entire residual group.

(Theoretical Background)

Now, description will be given of a theoretical background of X-ray diffraction pattern analysis performed by the analysis device 14.

When a mixture being a sample has K components, a weight fraction $w_k$ of the k-th component is expressed by the following equation (1).

$$w_k = \frac{a_k S_k}{a_1 S_1 + a_2 S_2 + \cdots + a_k S_k} \quad (1)$$

$S_k$ represents a total sum of intensities of the k-th component that have been subjected to the Lp correction, and corresponds to an observed intensity. Further, $a_k$ is a parameter calculated based on chemical composition information of the k-th component, which is stored in the storage unit 16, and corresponds to a reciprocal of a scattering intensity per unit weight. The parameter $a_k$ is expressed by the following equation (2).

$$a_k = M_k (\Sigma n_{ki}^2)^{-1} \quad (2)$$

In the equation (2), $M_k$ is a chemical formula weight of the k-th component. Further, $n_{ki'}$ is the number of electrons contained in the i-th atom in the chemical formula of the k-th component. $\Sigma$ means a sum of all atoms in the chemical formula of the k-th component.

Next, when the number of target components is KT (k=1 to KT), and the number of residual components is K-KT (k=KT+1 to K), the weight fraction $w_k$ (k=1 to KT) of the k-th component, which is one of the target components, is expressed by the following equation (3).

$$w_k = \frac{a_k S_k}{(a_1 S_1 + a_2 S_2 + \cdots + a_{KT} S_{KT} +) + a_{R\_av} S_R} \quad (3)$$

In the equation (3), $S_R$ is a total sum of observed intensities of the residual group that have been subjected to the Lp correction. In other words, $S_R$ means the following equation (4).

$$S_R = S_{KT+1} + S_{KT+2} + \ldots + S_k \quad (4)$$

It should be noted, however, that it is one of features of the at least one embodiment that, instead of calculating total sums $S_{KT+1}, S_{KT+2}, \ldots, S_K$ of observed intensities of the residual components, respectively, $S_R$ of the entire residual group is calculated.

Further, $a_{R\_av}$ is calculated based on chemical composition information of the entire residual group. A method of calculating $a_{R\_av}$ will be described later.

A weight fraction $w_R$ of the entire residual group is expressed by the following equation (5).

$$w_R = 1 - \sum_{k=1}^{KT} w_k \quad (5)$$

The parameter $a_k$ (k=1 to KT) is known for the target components, and $S_k$ (k=1 to KT) can also be calculated based on intensity ratios of the target patterns included in the observed pattern. As will be described later, a plurality of calculation methods exist also for $a_{R\_av}$. Further, as described below, the unknown pattern related to the residual group can also be calculated, and $S_R$ can also be calculated based on an intensity ratio of the unknown pattern. Thus, the weight fraction $w_k$ for each of the target components, and the weight fraction $w_R$ for the residual group, can be determined based on the equations (3) and (5).

(Fitting Pattern)

A fitting pattern is expressed by the following equation (6).

$$Y_i^{calc} = \sum_{k=1}^{KT} Sc_k^T Y_{ki}^T + Sc^R Sc_i Y_i^R + Y_i^{TMP} \quad (6)$$

In the equation (6), "i" represents each step of diffraction angle (i=1 to N). $Y_i^{calc}$ represents an intensity at the i-th diffraction angle in the fitting pattern. $Sc_k^T$ represents an intensity ratio of the k-th target component. $Y_{ki}^T$ represents an intensity of the k-th target component at the i-th diffraction angle in a diffraction pattern. As described above, the pattern shape is adjustable for $Y_{ki}^T$ by changing a shape parameter. It is assumed here that a given value is set to each of the two types of shape parameters: the lattice constants and the full-width at half maximum. $Sc^R$ represents an intensity ratio of the residual group. $Sc_i \times Y_i^R$ represents an unknown pattern, which is a diffraction pattern of the residual group. Of the unknown pattern $Sc_i \times Y_i^R$, $Y_i^R$ represents the initial pattern of the unknown pattern. Specifically, $Y_i^R$ represents an intensity at the i-th diffraction angle in the initial pattern. $Sc_i$ is a correction factor with respect to the intensity at the i-th diffraction angle, by which the initial pattern is multiplied. Every $Sc_i$ is set to 1 at the start of fitting. In order to keep an integrated intensity of the unknown pattern constant, $Sc_i$ has a constraint condition of the following equation (7).

$$N = \sum_{i=1}^{N} Sc_i \quad (7)$$

In other words, the fitting pattern $Y_i^{calc}$ expressed by the equation (6) includes a term obtained by multiplying a target pattern $Y_{ki}^T$ indicating a target component by an intensity ratio thereof, and a term obtained by multiplying an unknown pattern indicating the residual group by an intensity ratio thereof. Further, the two intensity ratios and the unknown pattern are fitting parameters.

Further, in the equation (6), $Y_i^{TMP}$ represents an intensity at the i-th diffraction angle in a temporary pattern. For $Y_i^{TMP}$, a polynomial or Fourier series having coefficients of the respective terms as fitting parameters can be adopted, for example. $Y_i^{TMP}$ is a provisional term having a role of causing the unknown pattern to converge satisfactorily, and takes zero or a value extremely close to zero at the end of calculation.

(First Fitting Step)

In fitting, in a state in which the unknown pattern is first set to $Y_i^R$ being the initial pattern, $Sc_k^T$ being a first intensity ratio, $Sc^R$ being a second intensity ratio, and $Y_i^{TMP}$ are changed to fit the fitting pattern $Y_i^{calc}$ to an observed pattern $Y_i^{obs}$. Specifically, in order to set the unknown pattern to $Y_i^R$ being the initial pattern, every $Sc_i$ is set to 1. For example, $Sc_k^T$, $Sc^R$, and $Y_i^{TMP}$ are determined so that a difference between $Y_i^{calc}$ expressed in the equation (6) and the observed pattern $Y_i^{obs}$ obtained from the X-ray diffractometer 12 is minimized through use of the least squares method or other methods.

(Second Fitting Step)

Next, in a state in which $Sc_k^T$, $Sc^R$, and $Y_i^{TMP}$ are fixed to the values determined in the first fitting step, the unknown pattern $Sc_i \times Y_i^R$ is changed to fit the fitting pattern $Y_i^{calc}$ to the observed pattern $Y_i^{obs}$. In this example, $Sc_i$ is changed to change the unknown pattern $Sc_i \times Y_i^R$.

Specifically, $Sc_i$ is calculated by the following equation (8).

$$Sc_i = \frac{1}{Sc^R Y_i^R} \left( Y_i^{obs} - \sum_{k=1}^{KT} Sc_k^T Y_{ki}^T \right) \quad (8)$$

$Sc_i$ expressed by the equation (8) does not satisfy the requirement of the equation (7). To address this problem, $Sc_i$ is normalized by the following equation (9).

$$Sc_i^{new} = NSc^R \left( S_A - \sum_{k=1}^{KT} Sc_k^T S_{Bk} \right)^{-1} \times Sc_i^{old} \quad (9)$$

In the equation (9), $Sc_i^{new}$ represents the normalized $Sc_i$, and $Sc_i^{old}$ represents the left-hand side of the equation (8). Further, $S_A$ and $S_{Bk}$ are expressed by the following equations (10) and (11), respectively.

$$S_A = \sum_{i=1}^{N} \frac{Y_i^{obs}}{Y_i^R} \quad (10)$$

$$S_{Bk} = \sum_{i=1}^{N} \frac{Y_{ki}^T}{Y_i^R} \quad (11)$$

Then, the first fitting step is executed again with use of the normalized $Sc_i$. In other words, the first fitting step and the second fitting step are executed a plurality of times repetitively until the error between $Y_i^{obs}$ and $Y_i^{calc}$ converges. The equation (8) expresses a value of $Sc_i$ in a case in which it is assumed that a sum of the first term and the second term on the right-hand side of the equation (6) is equal to the observed pattern $Y_i^{obs}$. As a result, the value of the temporary pattern $Y_i^{TMP}$ is absorbed by the second term related to the residual group. Thus, at the end of calculation, the value of the temporary pattern $Y_i^{TMP}$ converges to zero, or a value extremely close to zero. The fitting pattern $Y_i^{calc}$ is thus fitted to the observed pattern $Y_i^{obs}$.

In the description given above, given values are set to each of the two types of shape parameters (the lattice constants and the full-width at half maximum) of the target pattern $Y_{ki}^T$. In the at least one embodiment, the parameter fitting described above is executed a plurality of times with the given values changed each time. Values of the two types of shape parameters of the target pattern $Y_{ki}^T$ are optimized in this manner. As described later, an error included in the target pattern $Y_{ki}^T$ results in inclusion of a component corresponding to the error (a corresponding error component) in the unknown pattern related to the residual group. This causes the unknown pattern to be inaccurate, and allows inclusion of errors in $Sc_k^T$ and $Sc^R$, which are final calculation results. The corresponding error component can be minimized by optimizing the values of the two types of shape parameters of the target pattern $Y_{ki}^T$. As will be described later, which shape parameter values are optimum can be determined based on the unknown pattern $Sc_i \times Y_i^R$.

Figure 2:
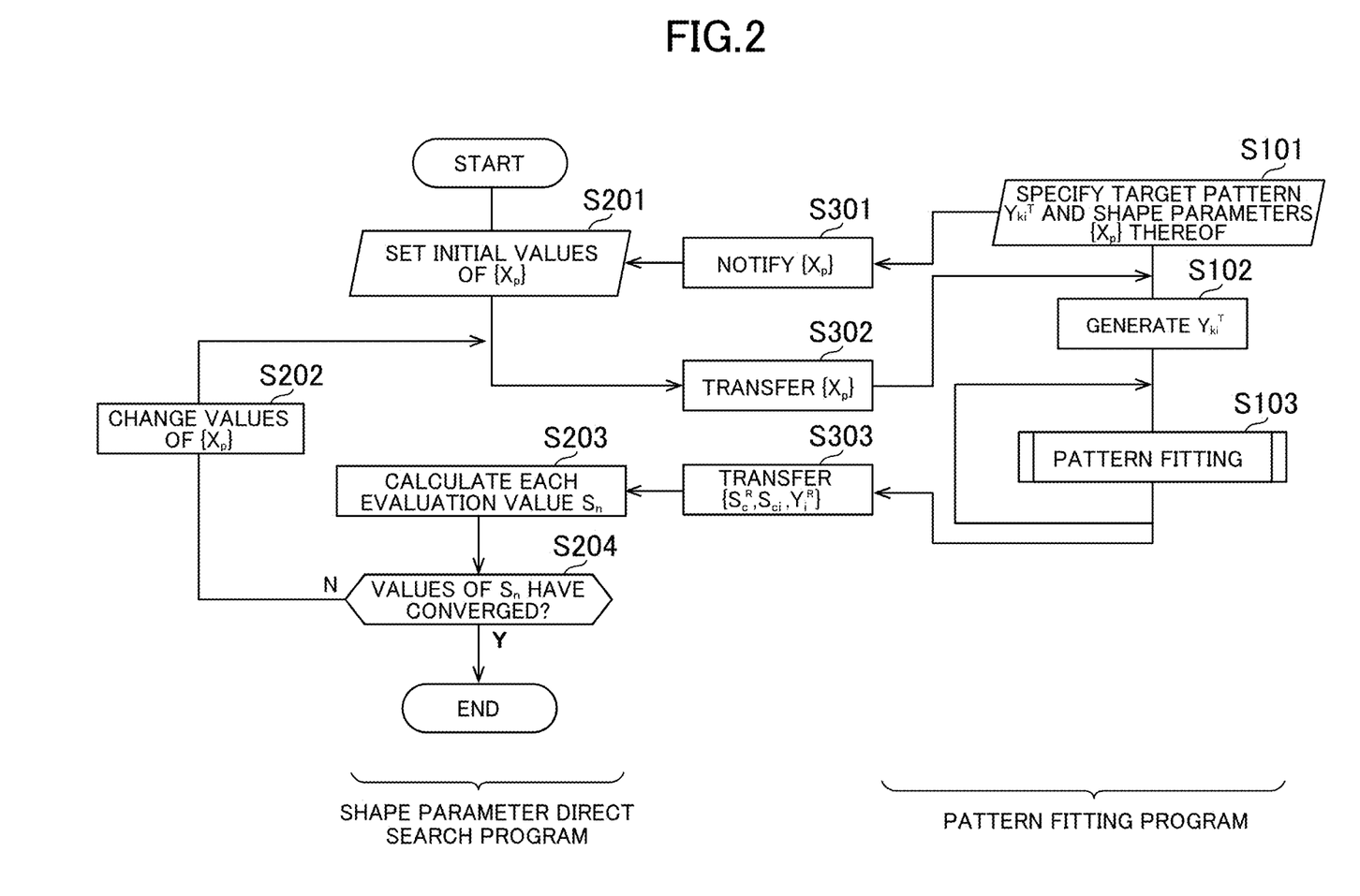
FIG. 2 is a flow chart illustrating operation of an analysis device.

FIG. 2 is a flow chart for illustrating operation of the analysis device 14. The analysis program executed by the analysis device 14 includes a shape parameter direct search program (Step S201 to Step S204) illustrated on the left side of FIG. 2, a pattern fitting program (Step S101 to Step S103) illustrated on the right side of FIG. 2, and a program (Step S301 to Step S303) that serves as a bridge between those two programs.

The analysis device 14 first specifies the target pattern $Y_{ki}^T$ and a shape parameter $X_p$, which is a variable parameter thereof (Step S101). Here, two parameters, namely, lattice constants of the target component and a full-width at half maximum of a peak, are each used as the shape parameter $X_p$. A set $\{X_p\}$ of shape parameters that are each the shape parameter $X_p$ is notified to the shape parameter direct search program (Step S301).

The shape parameter direct search program executes an optimization algorithm, and the Nelder-Mead method (simplex method/amoeba method), which is a direct search method, is used here as an example of optimization algorithms. The shape parameter direct search program first sets an initial state of a two-dimensional simplex that corresponds to the set $\{X_p\}$ of shape parameters that are each the shape parameter $X_p$. Specifically, initial coordinates are set to each of three vertices of the two-dimensional simplex (Step S201). For each pair of the initial coordinates, coordinates stored in the storage unit 16 in advance may be set, or coordinates may be manually set via an input device (not shown). Each of the vertices corresponds to one set $\{X_p\}$ of shape parameters that are each the shape parameter $X_p$, and each set $\{X_p\}$ of shape parameters corresponding to one of the vertices is transferred to the pattern fitting program (Step S302).

The pattern fitting program generates the target pattern $Y_{ki}^T$ corresponding to each of the vertices of the simplex, based on each set $\{X_p\}$ of shape parameters (Step S102). At this point, various types of physical property data about the target component which are stored in the storage unit 16 in advance are referred to as well. Pattern fitting that will be described later is then executed with use of one target pattern $Y_{ki}^T$ corresponding to one of the vertices at a time (Step S103).

When the pattern fitting is finished for every vertex, $Sc^R$, $Sc_i$, and $Y_i^R$ of the fitting pattern $Y_i^{calc}$ corresponding to each of the vertices are transferred to the shape parameter direct search program (Step S303).

The shape parameter direct search program calculates an evaluation value $S_n$ corresponding to each of the vertices, based on $Sc^R$, $Sc_i$, and $Y_i^R$ of the fitting pattern $Y_i^{calc}$ corresponding to each of the vertices (Step S203). The evaluation value $S_n$ is based on the unknown pattern $Sc_i \times Y_i^R$. To give an example, a value obtained by the following equation (12) of the evaluation value $S_n$ may be used. The letter "n" in $S_n$ is a symbol representing any natural number (may be a positive number equal to or larger than 1).

$$S_n = \frac{1}{N} \sum_{i=2}^{N} |Sc_i Y_i^R - Sc_{i-1} Y_{i-1}^R|^n \quad (12)$$

The evaluation value $S_n$ expressed by the equation (12) is obtained by applying a function (here, a power of an absolute value) for conversion into a positive value to amounts of change of values at respective diffraction angles of the unknown pattern $Sc_i \times Y_i^R$, and calculating a sum of values of the function. A total of values of change of the unknown pattern $Sc_i \times Y_i^R$ can be evaluated in this manner. When the corresponding error component described above is included in the unknown pattern $Sc_i \times Y_i^R$, the total of values of change of the unknown pattern $Sc_i \times Y_i^R$ tends to be large. Accordingly, selection of the set $\{X_p\}$ of shape parameters that is suitable for the target pattern $Y_{ki}^T$ and reduction of the corresponding error component included in the unknown pattern $Sc_i \times Y_i^R$ are accomplished by minimizing the evaluation value $S_n$ expressed by the equation (12). Although values to which the function described above is applied here are amounts of change of the unknown pattern itself, the function may be applied to an amount of change of a value obtained by multiplying the unknown pattern by $Sc^R$. Alternatively, when $Y_i^R$ is a fixed value, $Sc_i$ can be viewed as identical with the unknown pattern, and the function may accordingly be applied to amounts of change of $Sc_i$.

When convergence of evaluation values that are each the evaluation value $S_n$ is unsatisfactory, the coordinates of the three vertices of the two-dimensional simplex are changed (Step S202), and processing of Step S302 and subsequent steps is executed again. The coordinates are changed by using three manipulations (reflection, expansion, and contraction) of the Nelder-Mead method.

Convergence of evaluation values that are each the evaluation value $S_n$ may be determined by, for example, whether the three evaluation values that are each the evaluation value $S_n$ corresponding to one of the three vertices of the simplex satisfy a predetermined condition (whether the three evaluation values are satisfactorily close to one another). Alternatively, whether the evaluation values have converged to a satisfactory degree may be determined by whether the smallest value out of evaluation values that are each the evaluation value $S_n$ corresponding to an immediately preceding simplex, and the smallest value out of evaluation values that are each the evaluation value $S_n$ corresponding to the current simplex, satisfy a predetermined condition (whether the former smallest value and the latter smallest value are satisfactorily close to each other).

When it is determined in Step S204 that convergence of evaluation values that are each the evaluation value $S_n$ is satisfactory, the shape parameter direct search program ends the processing. At this point, $Sc_k^T$ and $Sc^R$ corresponding to the smallest value of the evaluation value $S_n$ are output as calculation results. That is, the evaluation value $S_n$ is calculated based on the unknown pattern $Sc_i \times Y_i^R$, and $Sc_k^T$ and $Sc^R$ are selected based on the calculated evaluation value $S_n$.

A value expressed by the following equation (13) may be adopted as a modification example of the evaluation value $S_n$. The letter "n" in $S_n$ is a symbol representing any natural number (may be a positive number equal to or larger than 1) in this modification example as well.

$$S_n = \frac{1}{N}\sum_{i=1}^{N}|Sc_i Y_i^R|^n \quad (13)$$

The evaluation value $S_n$ expressed by the equation (13) is obtained by applying a function (here, a power of an absolute value) for conversion into a positive value to values at respective diffraction angles of the unknown pattern $Sc_i \times Y_i^R$, and calculating a sum of values of the function. A total of amplitudes of the unknown pattern $Sc_i \times Y_i^R$ can be evaluated in this manner. When the corresponding error component described above is included in the unknown pattern $Sc_i \times Y_i^R$, the total of amplitudes of the unknown pattern $Sc_i \times Y_i^R$ tends to be large. Accordingly, selection of the set $\{X_p\}$ of shape parameters that is suitable for the target pattern $Y_{ki}^T$ and reduction of the corresponding error component included in the unknown pattern $Sc_i \times Y_i^R$ are accomplished by minimizing the evaluation value $S_n$ expressed by the equation (13). Although values to which the function described above is applied here are the unknown pattern itself, the function may be applied to a value obtained by multiplying the unknown pattern by $Sc^R$. Alternatively, when $Y_i^R$ is a fixed value, $Sc_i$ can be viewed as identical with the unknown pattern, and the function may accordingly be applied to $Sc_i$.

Figure 3:
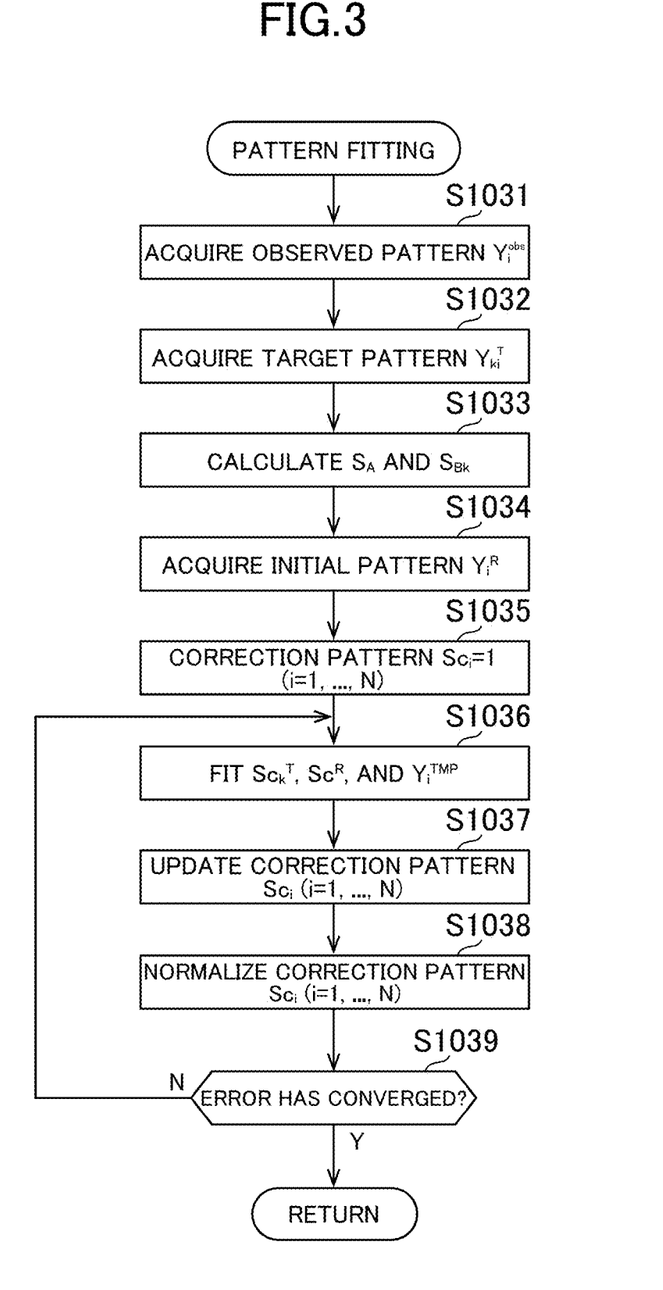
FIG. 3 is a flow chart illustrating processing of parameter fitting.

FIG. 3 is a flow chart for illustrating processing of the above-mentioned pattern fitting (Step S103) in the analysis device 14.

The analysis device 14 first acquires the observed pattern $Y_i^{obs}$ from the X-ray diffractometer 12 (Step S1031). The analysis device 14 further reads one target pattern $Y_{ki}^T$ out of the plurality of target patterns generated in Step S102 of FIG. 2 (Step S1032). The equations (10) and (11) are then used to calculate $S_A$ and $S_{Bk}$ (Step S1033). The initial pattern $Y_i^R$ is further read out of the storage unit 16 (Step S1034).

Every value of a correction pattern $Sc_i$ is then initialized to 1 (Step S1035), and the first fitting step described above is executed (Step S1036). That is, $Sc_k^T$, $Sc^R$, and $Y_i^{TMP}$ serving as fitting parameters are determined so that the error between $Y_i^{calc}$ expressed by the equation (6) and the observed pattern $Y_i^{obs}$ is minimized. In Step S1036, $Y_i^{calc}$ expressed by the equation (6) is acquired, and the values acquired in Step S1032, Step S1034, and Step S1035 are used as substitutes.

Next, the correction pattern $Sc_i$ (before normalization) is calculated (Step S1037) by the equation (8), and the calculated correction pattern $Sc_i$ is normalized by the equation (9) (Step S1038).

The processing of Step S1035 to Step S1038 is repeated until the error between $Y_i^{calc}$ and the observed pattern $Y_i^{obs}$ satisfies a convergence condition (Step S1039). This processing is executed for every target pattern $Y_{ki}^T$, and $Sc^R$, $Sc_i$, and $Y_i^R$ included in the second term of the fitting pattern $Y_i^{calc}$ are output.

The quantitative phase analysis can be performed by using a result of matching the fitting pattern $Y_i^{calc}$ to the observed pattern $Y_i^{obs}$ with the shape parameters optimized in the manner described above. In addition, the unknown pattern $Sc_i \times Y_i^R$ is usable to perform structural analysis of an unknown component by the Rietveld method or the like.

When the quantitative phase analysis is performed, values of $S_k$ and $S_R$ are calculated with use of $Sc_k^T$ and $Sc^R$. For example, when $Y_{ki}^T$ and $Y_i^R$ are standardized in advance, $S_k$ is equal to $Sc_k^T$, and $S_R$ is equal to $Sc^R$. Then, those values are substituted into the equation (3) to calculate the weight fraction $w_k$. Further, the value of the weight fraction $w_k$ is substituted into the equation (5) to calculate the weight fraction $w_R$ related to the residual group.

(Method (1) of Calculating $a_{R\_av}$)

Now, a method of calculating $a_{R\_av}$ will be described.

In a case in which it is known at what mixture ratios components of what chemical compositions exist with respect to the residual group, $a_{R\_av}$ can be determined directly from those items of information.

In other words, when the residual group consists of a substance A ($W_A$ g) and a substance B ($W_B$ g), the residual group gives a scattering intensity expressed by the following equation (14).

$$w_A a_A^{-1} + w_B a_B^{-1} \tag{14}$$

When this scattering intensity is divided by a gross weight of the residual group, a scattering intensity per unit weight, that is, $a_{R\_av}$, is determined. In other words, $a_{R\_av}$ is given by the following equation (15).

$$a_{R\_av}^{-1} = \frac{W_A a_A^{-1} + W_B a_B^{-1}}{W_A + W_B} \tag{15}$$

When the equation (15) is generalized to the residual group consisting of K-T components, $a_{R\_av}$ is expressed with use of the weight fraction $w_k$ as in the following equation (16).

$$a_{R\_av}^{-1} = \sum_{k'=T+1}^{K} w_{k'} a_{k'}^{-1} \tag{16}$$

In the equation (16), $a_{k'}$ can be calculated based on the chemical composition information with use of the equation (2). Accordingly, in the case in which it is known at what mixture ratios components of what chemical compositions exist in the residual group, $a_{R\_av}$ can be calculated based on the equation (16).

(Method (2) of Calculating $a_{R\_av}$)

Next, description will be given of a case in which, although the chemical composition information of the entire mixture (batch composition) is known, the chemical composition information is unknown for the residual group. The chemical composition information of the batch composition can be determined by applying fluorescent analysis to the batch composition, for example. Alternatively, when it can be assumed that there is no volatile component, chemical composition information of a raw material used for synthesis of the mixture can be directly used.

In such case, the chemical composition information of the batch composition is substituted into the equation (2) to calculate $a_k$ for the entire mixture sample. This value is denoted by $a_B$.

As in the equation (16), $a_B$ of the batch composition is expressed by the following equation (17).

$$a_B^{-1} = a_{R\_av}^{-1} w_R + \sum_{k'=1}^{T} w_{k'} a_{k'}^{-1} \tag{17}$$

The equation (17) is modified, and $a_{R\_av}$ for the residual group is expressed by the following equation (18).

$$a_{R\_av}^{-1} = \frac{1}{w_R} \left( a_B^{-1} - \sum_{k'=1}^{T} w_{k'} a_{k'}^{-1} \right) \tag{18}$$

In the equation (18), $a_B$ and $a_{k'}$ are known, but weight fractions $w_R$ and $w_{k'}$ are unknown. Thus, for example, assuming an initial value of $a_{R\_av}$ to be $a_B$, the weight fractions $w_R$ and $w_{k'}$ are calculated based on the equations (3) and (5), and are substituted again into the equation (18) to calculate $a_{R\_av}$ again. This calculation can be repeated to calculate $a_{R\_av}$ that is close to a true value.

Figure 4:
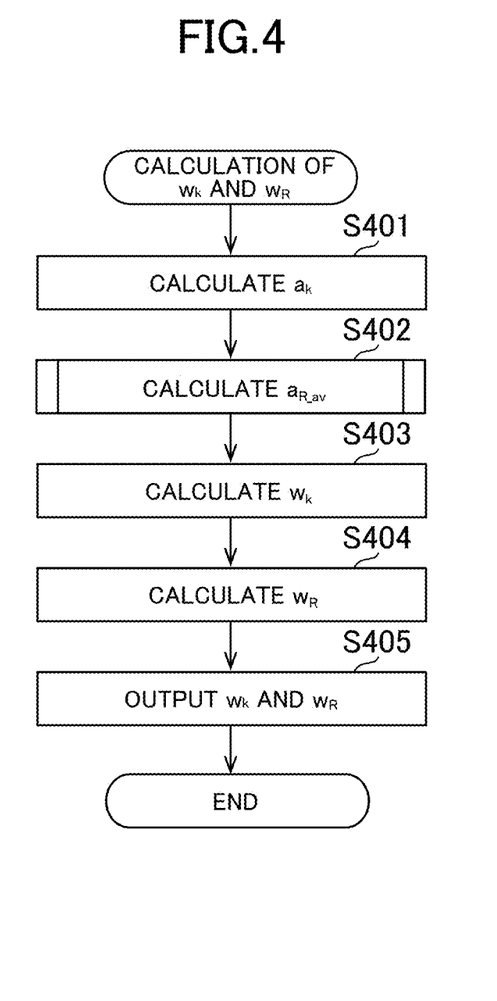
FIG. 4 is a flow chart illustrating a procedure of calculating weight fractions of a target component and a residual group.

FIG. 4 is a flow chart illustrating processing of calculating the weight fraction $w_k$ of each target component and the weight fraction $w_R$ of the residual group. As illustrated in FIG. 4, the analysis device 14 reads chemical composition information of the target component out of the storage unit 16 to calculate $a_k$ using the equation (2) (Step S401). Further, the analysis device 14 calculates $a_{R\_av}$ for the residual group (Step S402). For example, in the case in which it is known at what mixture ratios components of what chemical compositions exist in the residual group, $a_{R\_av}$ is calculated based on the equation (16).

Thereafter, the weight fraction $w_k$ of the target component is calculated based on the equation (3) (Step S403). Further, the weight fraction $w_R$ of the residual group is calculated based on the equation (5) (Step S404). Then, the weight fractions $w_k$ and $w_R$ are displayed on the display unit 18 (Step S405).

Figure 5:
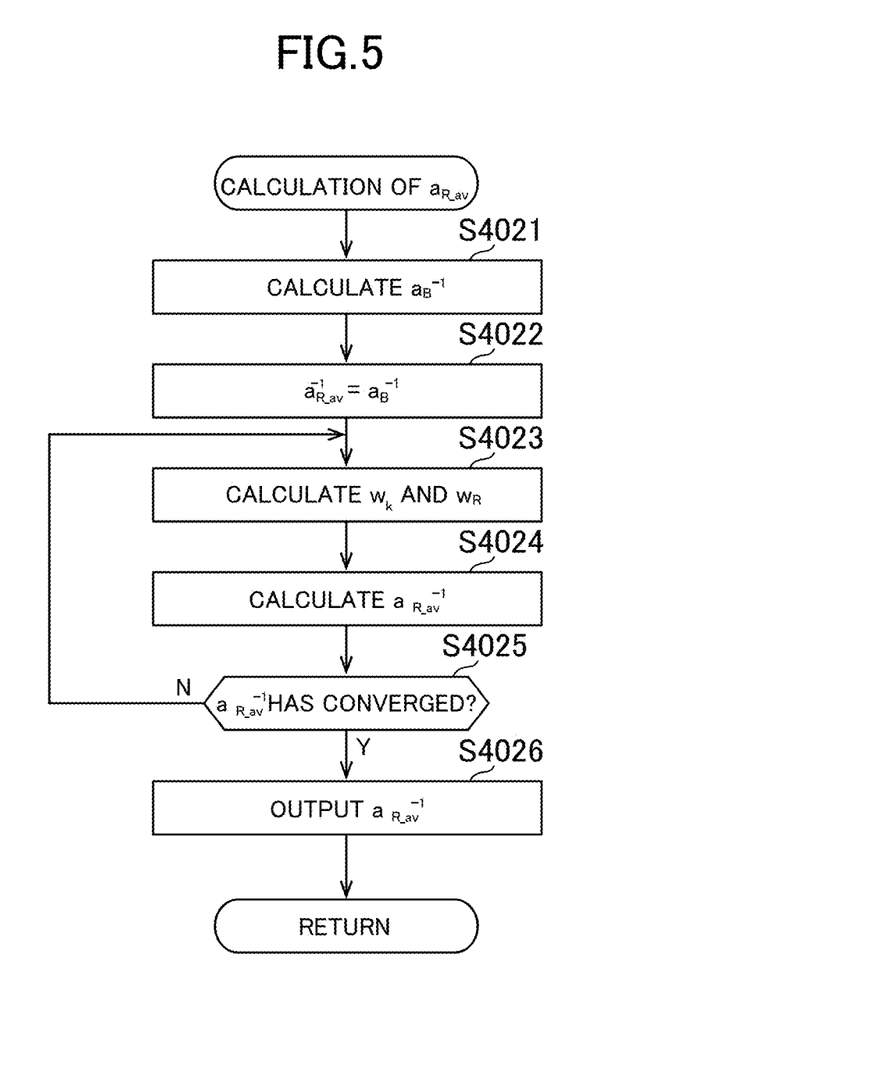
FIG. 5 is a flow chart illustrating a procedure of calculating a variable $a_{R\_av}$.

FIG. 5 is a flow chart for illustrating a procedure of calculating a variable $a_{R\_av}$. The processing illustrated in FIG. 5 is an example of the processing of Step S402 illustrated in FIG. 4. The analysis device 14 reads the chemical composition information of the batch composition out of the storage unit 16, and calculates $a_B^{-1}$ for the batch composition by the equation (17) (Step S4021). Next, $a_B^{-1}$ is set as an initial value of $a_{R\_av}^{-1}$ (Step S4022), and the weight fractions $w_k$ and $w_R$ are calculated by the equation (3) and the equation (5) (Step S4023). Those values are substituted into the equation (18) to calculate $a_{R\_av}^{-1}$ (Step S4024). The processing of Step S4023 and Step S4024 is repeated until $a_{R\_av}^{-1}$ satisfies a convergence condition, and when the convergence condition is satisfied, $a_{R\_av}^{-1}$ is output (Step S4026). This value may be used in the processing of Step S403.

Figure 6:
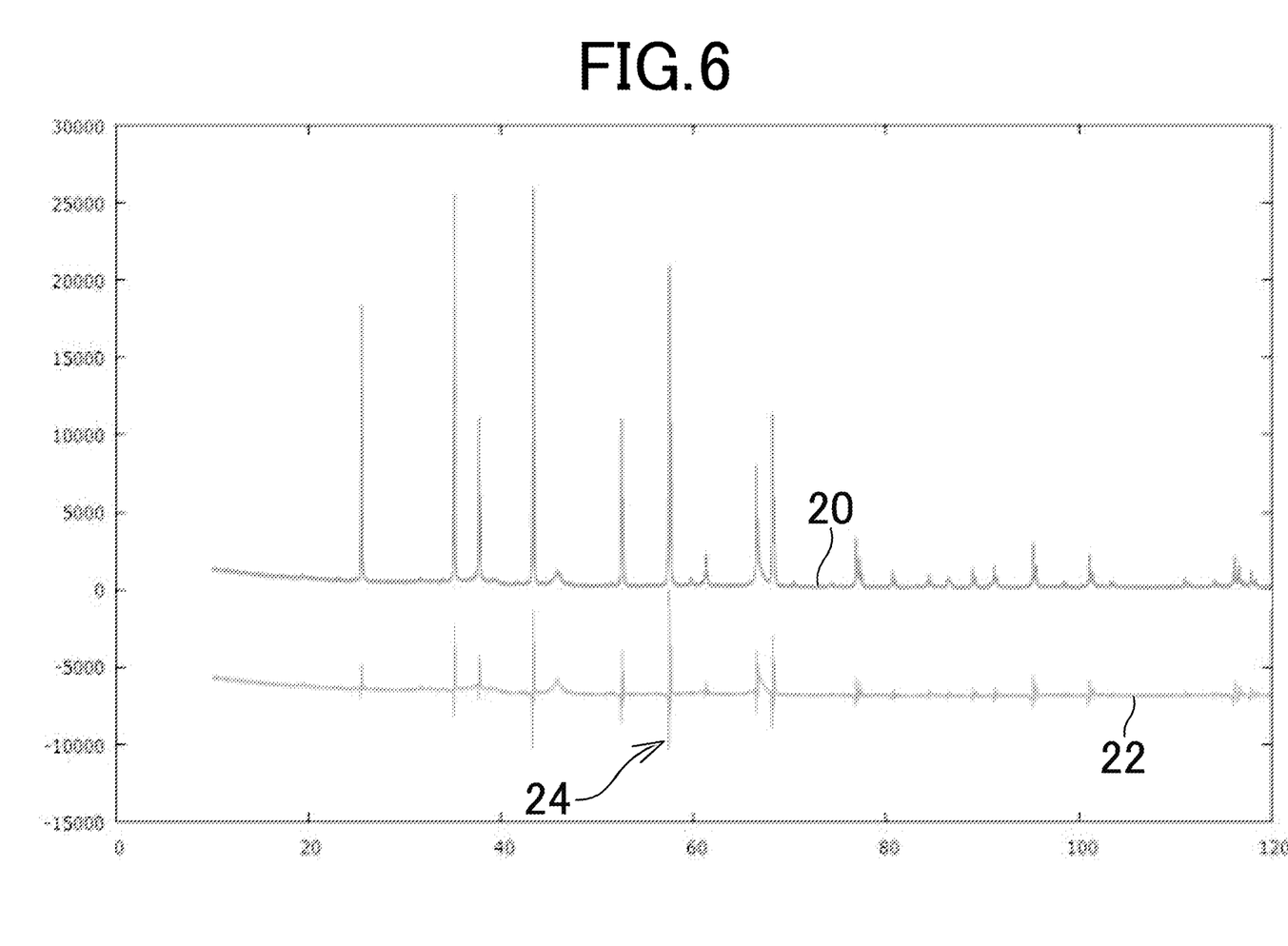
FIG. 6 is a graph showing an example of analysis by an analysis system in a comparative example.
Figure 7:
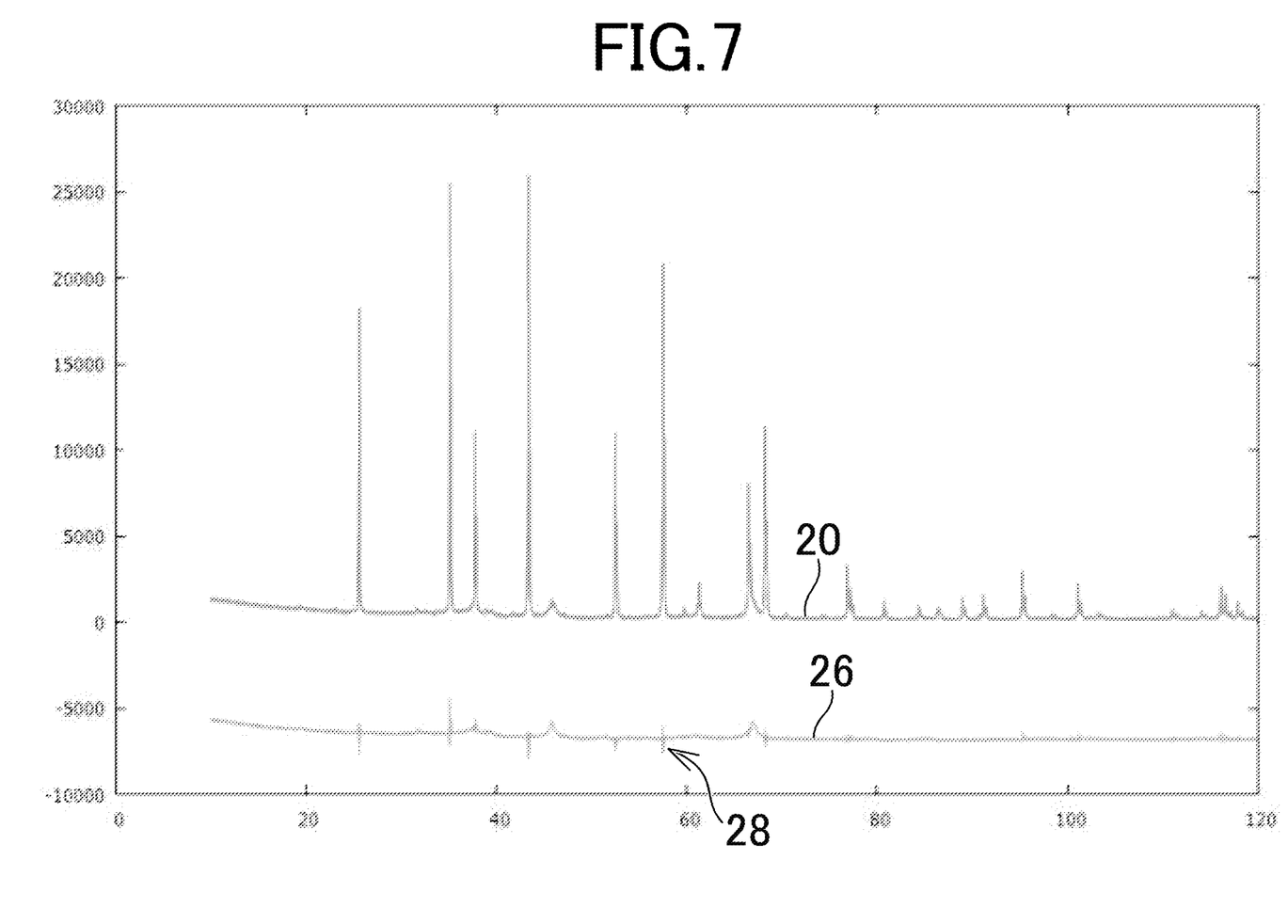
FIG. 7 is a graph showing an example of analysis by the analysis system in the at least one embodiment of the present invention.

FIG. 6 and FIG. 7 are graphs showing examples of analysis performed by the analysis system 10 on X-ray diffraction patterns of a mixture sample. The sample is a mixture of $\alpha\text{-}Al_2O_3$ and $\gamma\text{-}Al_2O_3$ (having a mixture ratio of 75:25). The target component is $\alpha\text{-}Al_2O_3$. The residual group is a single component and is $\gamma\text{-}Al_2O_3$. The diffraction pattern of the residual group is unknown. Note that, in FIG. 6, the set $\{X_p\}$ of shape parameters of the target pattern $Y_{ki}^T$ is not optimized. In FIG. 7, on the other hand, the set $\{X_p\}$ of shape parameters is optimized by the shape parameter direct search program.

In FIG. 6, the observed pattern $Y_i^{obs}$ is denoted by the reference symbol 20. The correction pattern $Sc_i$ is denoted by the reference symbol 22. In the correction pattern $Sc_i$, rapid rises and falls appear at positions of peaks of the target component (see a part indicated by the reference symbol 24 as an example). This corresponds to an error of the target pattern $Y_{ki}^T$, and is the corresponding error component described above.

In FIG. 7, on the other hand, the correction pattern $Sc_i$ denoted by the reference symbol 26 has small rises and falls at positions of peaks of the target component (see a part indicated by the reference symbol 28 as an example). The corresponding error component appearing at positions of peaks of the target component can thus be reduced in the correction pattern $Sc_i$ by optimizing the set $\{X_p\}$ of shape parameters by the shape parameter direct search program. As a result, the weight fraction $w_k$ of the target pattern and the weight fraction $w_R$ of the residual group can be calculated accurately. When the weight fraction of $\gamma\text{-}Al_2O_3$ was calculated by the method of the at least one embodiment, the error with respect to the true value was about 1%.

According to the at least one embodiment of the present invention described above, even in the case in which diffraction patterns are known for only some components, intensity ratios can be calculated not only for the components for which the diffraction patterns are known, but also for the residual group for which diffraction patterns are unknown, and weight fractions of those components can be calculated accurately. In addition, even more accurate weight fractions are calculable for a target component and the residual group because the shape of the target pattern $Y_{ki}^T$ is changeable with use of the set $\{X_p\}$ of shape parameters and each value of the set $\{X_p\}$ of shape parameters is optimized by an optimization algorithm. Accurate structural analysis and component quantification (or quantitative phase analysis) of an unknown component are accomplished as well because the unknown pattern $Sc_i \times Y_i^R$ can be generated with accuracy.

The present invention is not limited to the at least one embodiment described above, and is receptive to various modifications. For example, the intensity ratios of respective patterns may be calculated by methods other than the method of the description given above.

What is claimed is:

1. A device for analyzing a diffraction pattern of a mixture, the device comprising:
    an observed pattern acquisition module configured to acquire an observed pattern of X-ray diffraction;
    a first fitting module configured to fit a fitting pattern to the observed pattern by assigning a given value to a shape parameter and changing a first intensity ratio and a second intensity ratio with an unknown pattern set to an initial pattern, the fitting pattern including a term that is multiplication of a known target pattern, which indicates a target component and which is changeable in shape with use of the shape parameter, by the first intensity ratio, and a term that is multiplication of the unknown pattern by the second intensity ratio, the unknown pattern indicating a residual group including one or more residual components, the first intensity ratio, the second intensity ratio, and the unknown pattern serving as fitting parameters of the fitting pattern;
    a second fitting module configured to fit, after the fitting by the first fitting module, the fitting pattern to the observed pattern by changing the unknown pattern with changes to the first intensity ratio and the second intensity ratio restricted;
    a parameter generation module configured to generate a plurality of shape parameters each of which is the shape parameter;
    a control module configured to cause the first fitting module and the second fitting module to operate, by using each of the plurality of shape parameters; and
    a selection module configured to select the first intensity ratio related to one of the plurality of shape parameters, based on the unknown pattern.

2. The device for analyzing a diffraction pattern of a mixture according to claim 1, wherein the plurality of shape parameters include lattice constants of the target component.

3. The device for analyzing a diffraction pattern of a mixture according to claim 1, wherein the plurality of shape parameters include information about a width of a peak included in the known target pattern.

4. The device for analyzing a diffraction pattern of a mixture according to claim 1, wherein the selection module is configured to apply a function for conversion into a positive value to values indicating the unknown pattern, calculate a sum of values of the function, and select, based on the sum, the first intensity ratio related to one of the plurality of shape parameters.

5. The device for analyzing a diffraction pattern of a mixture according to claim 1, wherein the selection module is configured to apply a function for conversion into a positive value to amounts of change of values indicating the unknown pattern, calculate a sum of values of the function, and select, based on the sum, the first intensity ratio related to one of the plurality of shape parameters.

6. The device for analyzing a diffraction pattern of a mixture according to claim 1, wherein each of the plurality of shape parameters is used so that the first fitting module and the second fitting module are each caused to operate a plurality of times.

7. The device for analyzing a diffraction pattern of a mixture according to claim 1,
    wherein the fitting pattern further includes a term of a temporary pattern serving as a fitting parameter,
    wherein the first fitting module is configured to fit the fitting pattern to the observed pattern by changing the temporary pattern as well as the first intensity ratio and the second intensity ratio, and
    wherein the second fitting module is configured to change the unknown pattern so that at least a part of the term of the temporary pattern is absorbed by the term related to the residual group.

8. The device for analyzing a diffraction pattern of a mixture according to claim 1, wherein the device is configured to perform quantitative phase analysis of the target component based on the first intensity ratio and the second intensity ratio.

9. A method of analyzing a diffraction pattern of a mixture, the method comprising:
    an observed pattern acquisition step of acquiring an observed pattern of X-ray diffraction;
    a first fitting step of fitting a fitting pattern to the observed pattern by assigning a given value to a shape parameter and changing a first intensity ratio and a second intensity ratio with an unknown pattern set to an initial pattern, the fitting pattern including a term that is multiplication of a known target pattern, which indicates a target component and which is changeable in shape with use of the shape parameter, by the first intensity ratio, and a term that is multiplication of the unknown pattern by the second intensity ratio, the unknown pattern indicating a residual group including one or more residual components, the first intensity ratio, the second intensity ratio, and the unknown pattern serving as fitting parameters of the fitting pattern;
    a second fitting step of fitting, after the fitting in the first fitting step, the fitting pattern to the observed pattern by changing the unknown pattern with changes to the first intensity ratio and the second intensity ratio restricted;
    a parameter generation step of generating a plurality of shape parameters each of which is the shape parameter;
    a step of causing the first fitting step and the second fitting step to be executed, by using each of the plurality of shape parameters; and
    a step of selecting the first intensity ratio related to one of the plurality of shape parameters, based on the unknown pattern.

10. A computer-readable information storage medium having stored thereon a program for causing a computer to function as:

an observed pattern acquisition module configured to acquire an observed pattern of X-ray diffraction;

a first fitting module configured to fit a fitting pattern to the observed pattern by assigning a given value to a shape parameter and changing a first intensity ratio and a second intensity ratio with an unknown pattern set to an initial pattern, the fitting pattern including a term that is multiplication of a known target pattern, which indicates a target component and which is changeable in shape with use of the shape parameter, by the first intensity ratio, and a term that is multiplication of the unknown pattern by the second intensity ratio, the unknown pattern indicating a residual group including one or more residual components, the first intensity ratio, the second intensity ratio, and the unknown pattern serving as fitting parameters of the fitting pattern;

a second fitting module configured to fit, after the fitting by the first fitting module, the fitting pattern to the observed pattern by changing the unknown pattern with changes to the first intensity ratio and the second intensity ratio restricted;

a parameter generation module configured to generate a plurality of shape parameters each of which is the shape parameter;

a control module configured to cause the first fitting module and the second fitting module to operate, by using each of the plurality of shape parameters; and a selection module configured to select the first intensity ratio related to one of the plurality of shape parameters, based on the unknown pattern.

* * * * *